(12) United States Patent
Moriyama et al.

(10) Patent No.: US 7,017,475 B2
(45) Date of Patent: Mar. 28, 2006

(54) SOY MILK COAGULATING DEVICE (75) Inventors: Kou Moriyama, Fukuoka (JP); Kouji Nemoto, Fukuoka (JP); Masateru Tanaka, Kitakyushu (JP)

(73) Assignees: School Juridical Person of Fukuoka Kogyo Daigaku, Fukuoka (JP); Yuugengaisya Tanaka Chinmi, Fukuoka (JP)

( * ) Notice: Subject to any disclaimer, the term of this patent is extended or adjusted under 35 U.S.C. 154(b) by 103 days.

(21) Appl. No.: 10/699,296

(22) Filed: Oct. 31, 2003

(65) Prior Publication Data
US 2004/0107840 A1 Jun. 10, 2004

(30) Foreign Application Priority Data
Dec. 5, 2002 (JP) .............................. 2002-353970

(51) Int. Cl.
*A23L 1/00* (2006.01)
(52) U.S. Cl. ............................ 99/330; 99/355; 99/451; 99/453; 99/468; 99/483
(58) Field of Classification Search .......... 99/352–355, 99/348, 330, 452–455, 458–460, 483, 484, 99/485, 510–513, 467–472; 426/451, 468, 426/392, 393, 634, 518, 486, 507, 656
See application file for complete search history.

(56) References Cited

U.S. PATENT DOCUMENTS

| | | | | | |
|---|---|---|---|---|---|
| 4,062,276 | A | * | 12/1977 | Stahmann | ..................... 99/467 |
| 4,168,657 | A | * | 9/1979 | Hildebolt | ..................... 99/483 |
| 4,947,742 | A | * | 8/1990 | Nishibayashi | ................ 99/483 |
| 5,058,494 | A | * | 10/1991 | Hayashi et al. | ............... 99/453 |
| 5,807,602 | A | * | 9/1998 | Beutler et al. | .............. 426/598 |
| 6,065,861 | A | * | 5/2000 | Chen | .......................... 366/144 |
| 6,235,337 | B1 | | 5/2001 | Imamura et al. | |
| 6,331,324 | B1 | * | 12/2001 | Tomita et al. | .............. 426/634 |
| 6,688,214 | B1 | * | 2/2004 | Kikuchi et al. | ................ 99/483 |

* cited by examiner

*Primary Examiner*—Timothy F. Simone
(74) *Attorney, Agent, or Firm*—Jordan and Hamburg LLP

(57) ABSTRACT

A soy milk coagulating device includes: a coagulation vessel with an internal volume of 1,000 cc or less; two electrode plates facing each other to form a pair in the vessel; and a power feed controlling mechanism for controlling electricity fed to the electrode plates, and in the soy milk coagulating device, the power feed controlling mechanism is composed of: a tofu control system which is provided to heat soy milk to a set temperature at an average heating rate of equal to or less than 8° C. per minute, or at an average heating rate of more than 8° C. per minute and equal to or less than 15° C. per minute, and to keep the soy milk at the temperature for at least 5 minutes; a yuba control system; and switching unit which is provided to switch between the two control systems.

14 Claims, 6 Drawing Sheets

SOY MILK COAGULATING DEVICE

BACKGROUND OF THE INVENTION

1. Field of the Invention

The present invention relates to a soy milk coagulating device which makes it possible to make tofu and yuba from soy milk with ease in common households.

2. Description of the Prior Art

Tofu has long been mass-produced and sold by tofu manufacturers. Those tofu manufacturers use large-sized soy milk coagulating units, and it has been common to heat soy milk in such units mainly with steam, cut the coagulated soy milk into small portions, and put the portions into containers for sale.

Recently, tofu making devices that have coagulating units of relatively smaller volume (2 to 10 liters) to heat and coagulate soy milk utilizing Joule heat through direct electrification have been developed. The tofu making devices are put into industrial use in izakayas (Japanese-style pubs), restaurants, hotels, tofu specialty restaurants etc., enabling them to serve good tofu relatively easily. According to this method, every part of soy milk starts to generate heat basically at the same time due to Joule heat of the soy milk itself. This prevents convection of soy milk unlike steam heating or the like, thereby providing kinugoshi tofu (silken tofu: soft, smooth, and fine-grained) that is homogenous and dense.

However, conventional Joule heat method tofu making devices need expensive parts for temperature control, current control and the like, which makes the tofu making devices too pricey for common households to purchase. Also, the necessary current amount and the 2 to 10-liter batch of the conventional tofu making devices are too large for household use. In addition, the conventional tofu making devices are not easy to handle in homes.

The conventional tofu making devices put a sensor in the center of soy milk to control temperature. This could evoke resistance in users who are conscious of food hygiene, and presents a risk of sensor breakage when the tofu making devices are in operation or during washing.

In the process of coagulating soy milk by Joule heat, the electric resistance drops greatly in a part of the soy milk that has finished coagulation and gelation, namely, a part that has become tofu, thereby causing a selective current flow. The selective current flow results in further delay in coagulation of not-yet-coagulated part of the soy milk. Therefore, a coagulating unit of relatively large lot (2 to 10-liter batch), in particular, requires high level of coagulation control by control of current or the like, thus making the device expensive.

To make tofu, nigari (natural coagulant) is added to soy milk and then the mixture is heated. When soy milk is heated without adding nigari, yuba (a thin, solid surface layer of soy milk) is formed on the surface of the soy milk. If the Joule heat method tofu making devices are reduced in size and the problems described above are solved, making yuba as well as tofu in households with ease becomes possible.

SUMMARY OF THE INVENTION

An object of the present invention is therefore reduction in size and cost of a Joule heat method tofu making device which directly electrifies soy milk, to thereby provide a soy milk coagulating device which is safe and easy to handle for everyone, even those with little muscle strength, and which enables household members to make good tofu and yuba without difficulties and enjoy their fresh, flavorful, round tastes.

In order to solve the above-mentioned problems, according to the present invention, there is provided a soy milk coagulating device including: a coagulation vessel with an internal volume of 1,000 cc or less; two electrode plates facing each other to form a pair in the vessel; and a power feed controlling mechanism for controlling electricity fed to the electrode plates, in which the power feed controlling mechanism is composed of a tofu control system, a yuba control system and switching means between those two systems, the tofu control system being provided to heat soy milk to a set temperature at an average heating rate of equal to or less than 8° C. per minute, the yuba control system being provided to heat soy milk to a set temperature without putting any limitation on heating speed, the switching means being provided to switch between the two control systems.

Further, in order to solve the above-mentioned problems, according to the present invention, there is provided a soy milk coagulating device including: a coagulation vessel with an internal volume of 1,000 cc or less; two electrode plates facing each other to form a pair in the vessel; and a power feed controlling mechanism for controlling electricity fed to the electrode plates, in which the power feed controlling mechanism is composed of a tofu control system, a yuba control system and switching means, the tofu control system being provided to heat soy milk to a set temperature at an average heating rate of more than 8° C. per minute and equal to or less than 15° C. per minute, and to keep the soy milk at the temperature for at least 5 minutes, the yuba control system being provided to heat soy milk to a set temperature without putting any limitation on heating speed, the switching means being provided to switch between the two control systems.

Further, in the soy milk coagulating device according to the present invention, the power feed controlling mechanism preferably has a temperature sensor attached to a side wall or bottom of the coagulation vessel.

Further, the temperature sensor is preferably installed in a side wall or bottom of the coagulation vessel without being exposed on the inner face of the vessel.

Further, it is preferable that the temperature sensor is fixedly attached to a small, thin piece of metal that is attached to the inner face of the coagulation vessel, or that the temperature sensor is composed of a heat transfer plate which comes into surface-to-surface contact with the small, thin piece of metal, a thermoelectric couple which is fixedly attached to the heat transfer plate, and a pressurizing mechanism which is provided to bring the heat transfer plate and the small, thin piece of metal into contact with each other through pressurization.

Further, the surface of the small, thin piece of metal is preferably coated with a heat-transferable insulating film.

Further, the tofu control system preferably has a relay control function for cutting electricity feed to the electrode plates during temperature measurement.

DETAILED DESCRIPTION OF THE PREFERRED EMBODIMENTS

Figure 1:
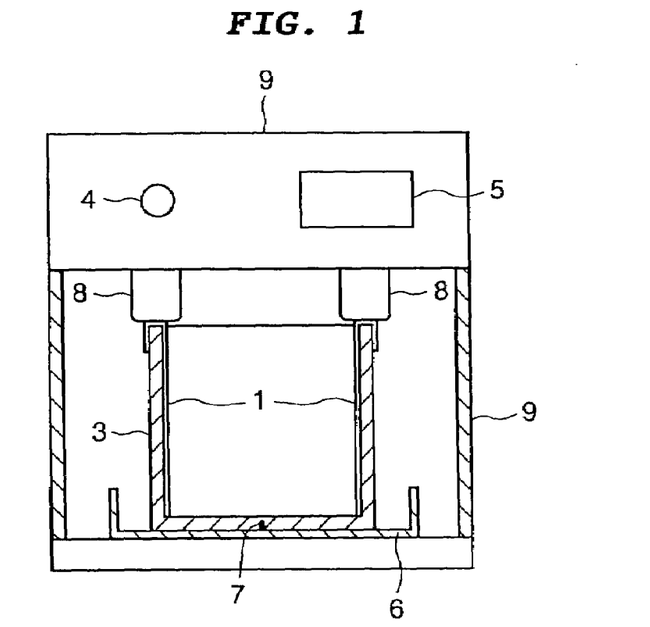
FIG. 1 is a frontal view showing a device according to an embodiment of the present invention with a part of the device cut off.
Figure 2:
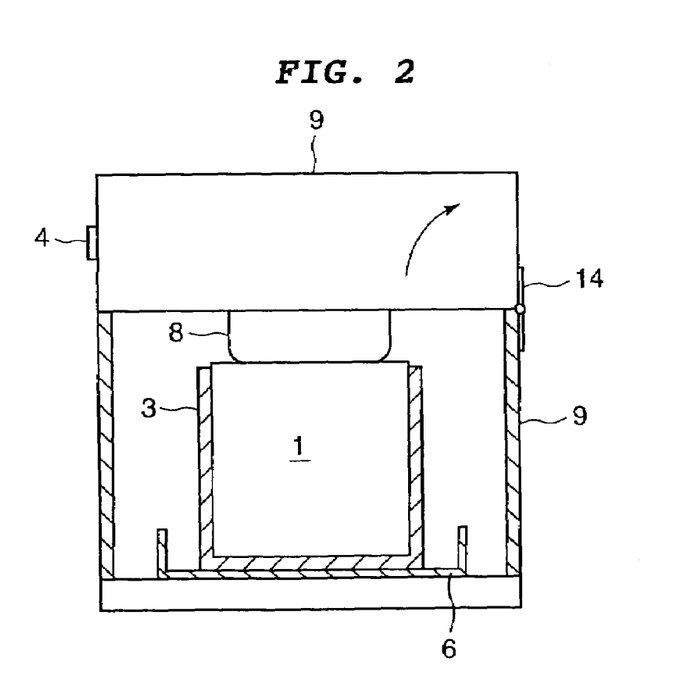
FIG. 2 is a side view showing the device according to the embodiment of the present invention with a part of the device cut off.

According to an embodiment shown in FIGS. 1 and 2, a device of the present invention is composed of a coagulation vessel 3, two electrode plates 1 and 1, which face each other forming a pair in the coagulation vessel 3, and a power feed mechanism for feeding electricity to the electrode plates 1 and 1. The power feed mechanism is, as in an example of FIG. 5, constituted of a tofu control system 16, a yuba control system 17, and switching means for switching between the two control systems. In this embodiment, a start/changeover switch 4 serves as the switching means.

Figure 5:
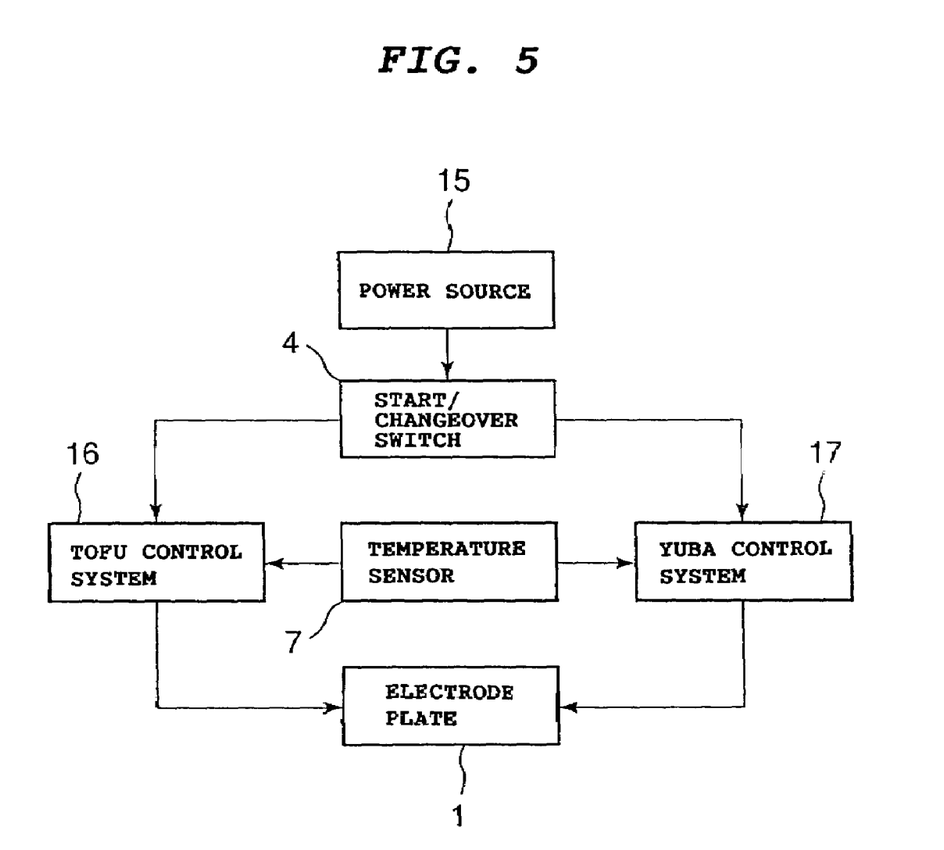
FIG. 5 is a block diagram showing an example of a control system used in the device according to the present invention.

The internal volume of the coagulation vessel 3 is limited to 1,000 cc or less in consideration for ease of controlling temperature for household use. The tofu control system 16 is a mechanism for heating soy milk to a set temperature at an average heating rate of equal to or less than 8° C. per minute, or a mechanism for heating soy milk to the set temperature at an average heating rate of more than 8° C. per minute and equal to or less than 15° C. per minute, and then keeping the soy milk at the temperature for at least 5 minutes. The yuba control system 17 is a mechanism for heating soy milk to a set temperature without putting any limitation on heating speed, and then keeping the soy milk at the temperature for a given period of time.

In this embodiment, the coagulation vessel 3 is placed on a tray 6 in a housing 9 as shown in FIGS. 1 and 2. The tray 6 is for receiving soy milk that is accidentally spilled. The housing 9 is divided into upper and lower sections. The upper section of the housing 9 is opened in the direction of the arrow as shown in FIG. 2 with the help of a hinge 14, so that the coagulation vessel 3 can be put in and pulled out of the housing 9.

Electrode terminals 8 and 8 are attached to the upper section of the housing 9 in a manner that brings the electrode terminals 8 and 8 into contact with the electrode plates 1 and 1 when the housing 9 is closed. The electrode plates 1 and 1 can receive electricity while being in contact with the electrode terminals 8 and 8. The control systems 16 and 17 may be housed in the upper or lower section of the housing 9, or may be separate from the housing 9. The current to be fed to the electrode plates is allowed to flow only when the housing 9 is closed. In FIG. 1, reference numeral 4 denotes the start/changeover switch; 5, a display panel; and 7, a temperature sensor for control.

To make tofu, the upper section of the housing 9 is opened, soy milk and nigari are put in the coagulation vessel 3, to which the electrode plates 1 and 1 are attached, the upper section of the housing 9 is closed, and the start/changeover switch 4 is turned to Tofu. This starts power feed to the electrode plates 1 and 1 to heat the soy milk mixture with Joule heat. The temperature of the soy milk mixture is raised to a set temperature, for example, 80° C., at an average heating rate of 8° C. per minute or less under automatic control. Power feed is automatically stopped as the set temperature is reached. By this time, the soy milk mixture has completed coagulation. The housing 9 is opened, and the coagulation vessel 3 is taken out to remove the resultant tofu, which is now ready to be served.

To make yuba, only soy milk is put in the coagulation vessel 3, the housing 9 is closed, and the start/changeover switch 4 is switched to Yuba. This starts heating of the soy milk with Joule heat. After a preset temperature, for example, 90° C., is reached, the soy milk is automatically kept at the set temperature for a preset period, for example, 5 minutes, and then power feed is automatically stopped. Yuba is now formed on the surface of the soy milk, and the housing 9 is opened to scoop up the yuba out of the coagulation vessel 3. Thereafter, the housing 9 is closed to make another layer of yuba in the same manner.

The present invention is about reduction in size of a coagulation vessel of a conventional Joule heat method tofu making device, while putting emphasis on low price, safety, and ease of use to render a tofu making device affordable and suitable for household use, with the aim of enabling household members to make good tofu and yuba easily. The aim is achieved by limiting the volume of the coagulation vessel 3 and the average heating rate and temperature holding time in the tofu control system 16 as described above.

If the coagulation vessel 3 is reduced in size, the distance between the pair of electrode plates 1 and 1 is shortened to lower the electric resistance during power feed and increase the amount of current per unit electrode area. The soy milk temperature, therefore, rises in a short period of time. Accordingly, when tofu is made, slight fluctuation in current density in soy milk leads to temperature difference, which causes a current to selectively flow into a part of the soy milk that has started coagulation earlier than other part. This increases the extent of current density fluctuation, triggering a vicious circle and making it difficult to obtain homogenous tofu.

Solving this by only current control means that the reduction in size requires even higher level of control, which works against cost reduction.

The device of the present invention sets the volume of the coagulation vessel 3 to 1,000 cc or less and limits the average heating rate in the tofu control system 16 to 8° C. per minute or less, thereby canceling fluctuation in heat generated by soy milk through transfer of heat in the soy milk and setting off coagulation uniformly throughout the soy milk. Homogenous and dense tofu is thus obtained. In addition, the device of the present invention makes the taste of tofu more uniformly by keeping soy milk at a set temperature for a while after the soy milk reaches the set temperature.

According to experiment results, coagulation starts to fluctuate as the average heating rate exceeds 8° C. per minute, presenting unhomogenous tofu in some cases. However, when the average heating rate does not exceed 15° C.

per minute even if it exceeds 8° C. per minute, it is possible to obtain homogenous, dense tofu as far as a set temperature is kept for at least 5 minutes after soy milk reaches the set temperature.

Tastiness of tofu is evaluated in general by (1) tongue and mouth: feel to the palate, chewiness, and ease of swallowing, (2) olfactory sense: flavor and smell, (3) visual sense: visual effects, smooth texture, and pretty packaging, (4) tactile sense: heaviness, springiness, solidness when picked up with a pair of chopsticks, etc. These factors are affected by the structure of an insoluble protein, which is formed by modification of protein in soy milk on contact with metal ions contained in nigari. It is believed that the structure of this insoluble protein influences the taste, texture, and the like of tofu because the insoluble protein obtains a denser structure when the coagulation speed is slowed down.

The device of the present invention can therefore present tofu that tastes good by presetting the heating rate and temperature keeping period according to one's preference.

On the other hand, making yuba does not use nigari, which serves as a coagulant, unlike making tofu. A temperature rise therefore does not start coagulation, and soy milk is heated until a set highest temperature is reached. As the heated soy milk cools down, a layer of yuba is formed on the surface. Accordingly, there is no need to limit the heating rate, and it is only when the soy milk temperature reaches about a set temperature that temperature control is required. The highest temperature is preset depending on a desired thickness of yuba or one's taste preference.

To control the temperature, the device of the present invention can employ a program controller equipped with a thyristor type power adjuster or an on/off program controller, for example. Employing an on/off temperature-time controller is desirable considering the overall device size and weight, cost, and the like.

It is preferable to use a temperature sensor to measure the soy milk temperature for temperature control. However, only when tofu or yuba of constant quality is to be made from a fixed amount of soy milk, the temperature can be controlled by a preset program, which dictates, for example, when by turning the current on and off, without using a temperature sensor.

A temperature sensor employable for measuring the soy milk temperature is a thermoelectric couple or the like. Any thermoelectric couple, e.g., Seebeck alumel-chromel, copper-constantan, or platinum-platinrhodium, can be used, but an alumel-chromel thermoelectric couple is preferred since this thermocouple exerts large thermoelectromotive force at a relatively low temperature of a subject as well as being inexpensive.

The conventional tofu making devices insert a platinum resistance thermometer in soy milk to control the soy milk temperature. No other choice is left for the conventional tofu making devices because a Seebeck thermoelectric couple, which detects minute thermoelectromotive force, cannot be used in soy milk that is directly electrified and because the center of the soy milk vessel is the almost only suitable temperature measuring point in a relatively large amount of soy milk. Thermometers used in the conventional tofu making devices are sheathed and protected by SUS 316, anti-corrosion stainless steel, in order to avoid corrosion from $MgCl_2$ and other nigari components. This is one of reasons that raise the price of the conventional devices.

In the device of the present invention, the temperature sensor 7 is preferably set on a side wall or bottom of the coagulation vessel 3. The temperature sensor 7 is buried in the bottom of the coagulation vessel 3 in the embodiment of FIG. 1. When choosing a side wall of the vessel to place the temperature sensor 7, the chosen wall may or may not have one of the electrode plates 1 and 1. Alternatively, the temperature sensor 7 may be in contact with one of the electrode plates 1 and 1.

When the temperature sensor 7 is buried in a side wall or bottom of the coagulation vessel 3, the sensor is not influenced by the current that directly electrifies the soy milk, and therefore can make a steady measurement by means of thermoelectromotive force.

In this case, there is a difference between the resultant temperature measured by the sensor 7 and the actual temperature in the vessel 3, requiring control for correcting the temperature difference. This could raise such problems as a conspicuous drop in heating rate at a point near the set highest temperature and a slight time lag in keeping the soy milk at the set temperature. However, the appropriate set temperature range for coagulation to obtain tofu is wide (about 70° C. to 85° C.) enough to render this harmless in making fine-grained tofu.

On the other hand, if the temperature sensor 7 is set in a manner that exposes the sensor to the interior of the coagulation vessel 3, the sensor can catch the slightest change in soy milk temperature. Minute temperature changes can be detected also when the temperature sensor 7 is installed in a manner that brings the sensor into contact with one of the electrode plates 1 and 1. In this case, it is preferable to measure the temperature when power feed to the electrode plates 1 and 1 is cut off so that the current in the soy milk does not affect the measurement. In the tofu control system, the temperature is measured when the electricity is turned off by on/off control during heating. In the yuba control system, power feed may be temporarily cut off to measure the temperature. If a small, thin piece of metal 12 is susceptible to corrosion, the metal piece should be coated with heat-transferable, anti-corrosion coating.

Figure 4:
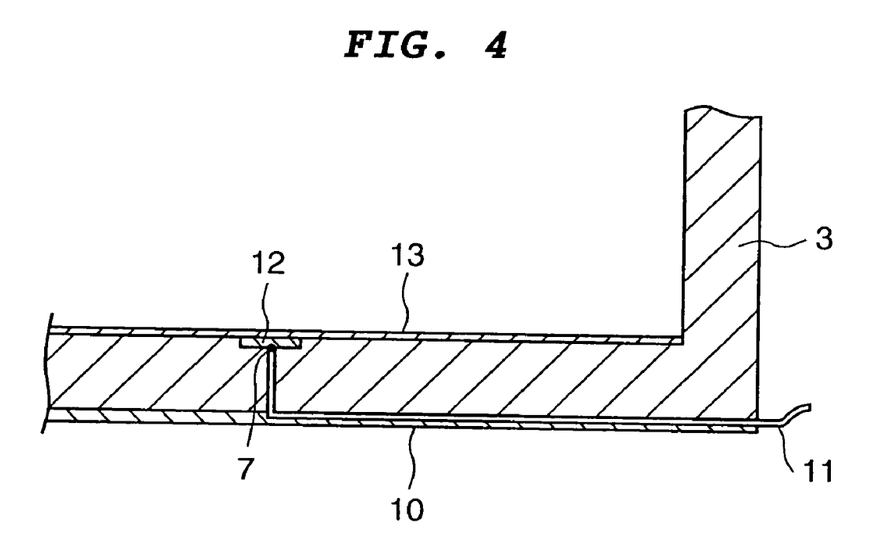
FIG. 4 is a sectional view showing an example of a coagulation vessel and an electrode plate used in the device according to the present invention.

In those cases, if the small, thin piece of metal 12 is attached in a manner that exposes the small piece 12 to the interior of the vessel and the temperature sensor 7 is fixedly attached to the small piece 12 by welding or wax welding as shown in the example of FIG. 4, the sensor is protected against corrosion from nigari components during manufacture of tofu. Employed as the small, thin piece of metal 12 is a copper plate or the like that has excellent heat conductivity.

If the surface of the small, thin piece of metal 12 is coated with a heat-transferable insulating coat 13, the temperature can be measured during power feed without being affected by the current in the soy milk. The insulating coat 13 can be formed of any insulator that has excellent heat conductivity, and, for example, fluorocarbon resin (Teflon (registered trademark)) is employable.

A lead wire 11 of the temperature sensor 7 becomes easy to handle if sandwiched and fixed between the coagulation vessel 3 and a plastic plate 10 as shown in FIG. 4, or buried in a side wall or bottom of the vessel 3, while the tip of the lead wire is detachable from the housing 9.

Figure 6:
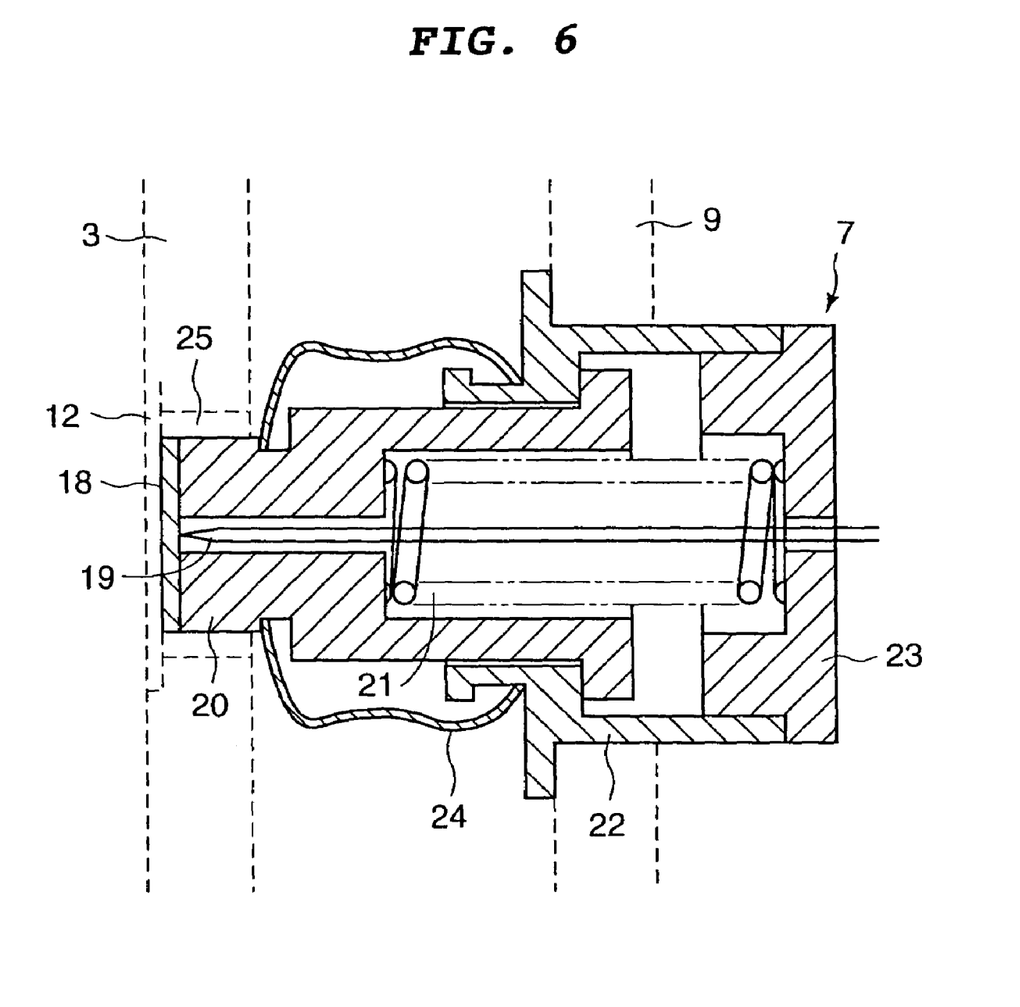
FIG. 6 is a sectional view showing an example of a temperature sensor used in the device according to the present invention.

As in the example shown in FIG. 6, the temperature sensor 7 of the device of the present invention is preferably composed of a heat transfer plate 18, a thermoelectric couple 19 and a pressurizing mechanism. The heat transfer plate 18 comes into surface-to-surface contact with the small, thin piece of metal 12 attached to a portion of the inner wall of the vessel 3. The thermoelectric couple 19 is fixedly attached to the heat transfer plate 18. The pressurizing mechanism brings the heat transfer plate 18 and the small, thin piece of metal 12 into contact with each other through pressurization.

The pressurizing mechanism in this embodiment uses a coil spring 21. The front end of a cylindrical slider 20 is fixed to the heat transfer plate 18 whereas the rear end of the slider 20 can slide back and forward in a cylindrical case 22. The coil spring 21 is inserted in a space created by the interior of the cylindrical slider 20 and a hold-down lid 23, which is fixed to the case 22, pushing the slider 20. The slider 20 and the case 22 are partially covered with a soft cover 24 made of rubber or the like, so that a length of the slider 20 that slides out of the case 22 is not exposed.

As shown in FIG. 6, the rear end of the case 22 is inserted in a hole in the housing 9, and the front end of the slider 20 is inserted in a concave portion 25 of the coagulation vessel 3. The small, thin piece of metal 12 is fixed to a portion of the inner wall of the vessel 3 where the concave portion 25 is located. The coagulation vessel 3 is pressed against the slider 20, thereby bringing the small, thin piece of metal 12 into contact with the heat transfer plate 18 at the front end of the slider 20 through pressurization. As a result, the heat transfer plate 18 comes into surface-to-surface contact with the small, thin piece of metal 12. Employed as the heat transfer plate 18 is a copper plate or the like that has excellent heat conductivity.

In this way, the heat transfer plate 18 to which the thermoelectric couple 19 is fixedly attached is brought into surface-to-surface contact with the small, thin piece of metal 12 through pressurization, and therefore the soy milk temperature in the coagulation vessel 3 can be measured with high sensitivity. This also eliminates the need to attach and detach the thermoelectric couple 19 in attaching and detaching the coagulation vessel 3. Moreover, this makes it possible to avoid errors in temperature measurement due to a very minute voltage change at a contact point where the thermoelectric couple 19 is attached and detached.

When the temperature sensor 7 of this embodiment is employed, as described above, it is preferable to coat the small thin piece of metal 12 with a heat-transferable insulating film or to have a relay control mechanism for measuring temperature while power feed to the electrode plates 1 and 1 is cut off. In the latter case, if the small, thin piece of metal 12 is susceptible for corrosion, the metal piece 12 should be coated with heat-transferable, anti-corrosion coating.

Soy milk used in the device of the present invention may be commercially-available one or may be made from soy beans. To make soy milk, soy beans are soaked in water until the beans swell with water, and the swelled beans are slurried, boiled, dried and strained to remove okara (bean curd refuse). Commercially-available soy milk is usually kept cold at 5 to 15° C.

In general, soy milk starts coagulation at 30° C. after nigari is added. For that reason, it is desirable to use soy milk having a temperature of 20° C. or lower in manufacturing tofu with the device of the present invention.

Calcium chloride, magnesium chloride, calcium sulfate, or the like can be used as a coagulant for tofu. However, natural nigari mainly containing magnesium chloride is desirable to make round-flavored tofu, which is an object of the present invention.

Preferably, the set highest temperature in the tofu control system 16 is 70 to 85° C., so that coagulation of soy milk is finished as quickly as possible while achieving the round flavor of tofu. The temperature at which heated soy milk is kept is also within this temperature range.

In manufacture of yuba in which the use a coagulant is not included, reaching 30° C. does not start coagulation, and therefore there is no limitation put on the temperature of soy milk to be used. However, in order to prevent spoiling, it is desirable to use soy milk that has been kept at 20° C. or lower as in manufacture of tofu, especially in summer or in a hot environment.

The set highest temperature in the yuba control system 17 is preferably higher than that of the tofu control system 16 by about 10° C., namely around 90° C. The temperature at which heated soy milk is kept is also higher and in a range between 85° C. and 90° C., preferably.

Since yuba is a coagulated top layer formed when heated soy milk cools down, a large area of the soy milk surface should be in contact with the air, and it is desirable to use a vessel that has a wider top than the vessel for making tofu does. It is also effective to lower the height of a side wall of the coagulation vessel 3 to which the electrode plates 1 and 1 are not attached, thereby achieving better ventilation over the soy milk surface when the housing 9 is opened.

Figure 3:
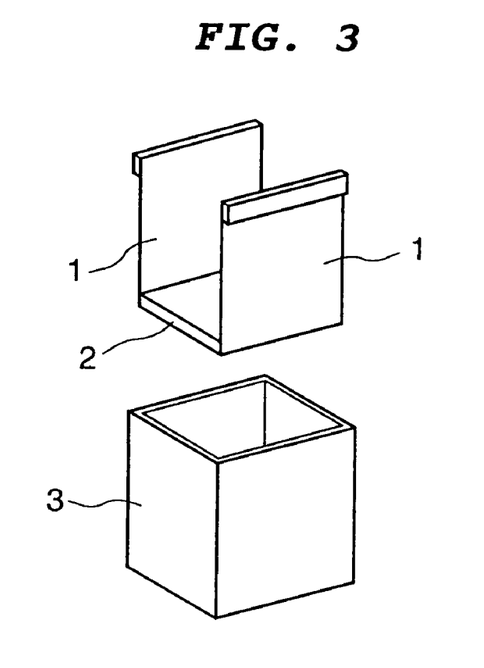
FIG. 3 is a perspective view showing an example of a coagulation vessel used in the device according to the present invention.

As shown in FIG. 3, an insulating plastic plate 2 connects the pair of electrode plates 1 and 1 to each other at the bottom. This facilitates attaching and detaching of the electrode plates 1 and 1 when washing the vessel 3 or the like. In addition, this is convenient in taking finished tofu out of the vessel.

The coagulation vessel 3 has to be electrically insulative but does not need to be particularly heat resistant since the highest temperature is about 90° C. Therefore, it is not necessary to use heat-resistant Duracon® (acetal copolymer) or the like, and the coagulation vessel 3 can be formed of plastic such as acrylic resin. The electrode plates 1 and 1 are desirably made of titanium or the like in order to prevent corrosion caused by nigari components.

Structured as above, the device of the present invention does not have safety problems and is easy to handle for every one (even for those with little muscle strength). Washing the device after use is easy, and if the coagulation vessel 3 is taken out of the housing 9 to detach the electrode plates 1 and 1 from the vessel and remove the lead wire 10 of the temperature sensor 7 from the housing, the device can now readily be washed. Removal of the lead wire 10 is not necessary when the temperature sensor 7 of FIG. 6 is employed.

EXAMPLES

Example 1

A coagulating device as the one shown in FIGS. 1 and 2 was manufactured by way of trial and an experiment of making tofu was conducted. A coagulation vessel 3 was made of acrylic resin. The bottom of the coagulation vessel 3 was a 80 mm×80 mm square (inner size) and the internal volume of the vessel was 500 cc. Electrode plates 1 and 1 were titanium plates connected to each other at the bottom by an insulating plastic plate 2 as shown in FIG. 3. The electrode area was set to 6400 $mm^2$ while setting the distance between the electrode plates to 80 mm. A 100 V power source for common household was employed. An alumel-chromel thermoelectric couple serves as a temperature sensor 7, and was spot-welded to a small, thin piece of metal 12, which was attached to an inner wall of the vessel 3 as shown in FIG. 4. The small, thin piece of metal 12 was a copper plate having a thickness of 0.3 mm and a diameter of 7 mm. The surface of the small piece 12 was coated with an insulating coat 13, namely, Teflon®.

450 cc of commercially-available soy milk was taken out of a refrigerator and poured into the coagulation vessel 3. 4.5 cc of natural nigari was added to the soy milk, and the mixture was stirred before the vessel was placed on a tray 6 in a housing 9. 80° C. was set as the highest temperature, the housing 9 was closed, and a start/changeover switch 4 was turned to Tofu, thereby starting heating of the soy milk mixture automatically.

As a comparative example, soy milk was heated without controlling the heating rate and instead current on/off control was conducted after reaching the set temperature. Changes in temperature and current in this comparative example are shown in Table 1. In the comparative example, the soy milk temperature reached 80° C. five minutes after the start of power feed, meaning that the average heating rate was 15° C. per minute. The soy milk at that point was in an uneven state and some part had finished coagulation forming tofu while the rest was uncoagulated forming yuba on the surface. After three minutes of on/off control, the resultant tofu was removed from the vessel. The tofu was nonhomogenous and lacked flavor.

However, with additional three minutes of on/off control, namely, when the set temperature (80° C.) was kept for six minutes through on/off control after reaching the set temperature, homogenous tofu was obtained.

As an example of the present invention, on/off control was conducted in the middle of heating. Changes in temperature and current in this example are shown in Table 2. In this example, the current was turned on and off at one-minute intervals after power feed was started. For instance, in Table 2, power feed was turned off from the point one minute past the start to the two-minute point. The current value column in Table 2 show that, for example, the current was changed from 3.7 A to 0 A at the one-minute point whereas there was a change in current from 0 A to 4.2 A at the two-minute point. The temperature reached 80° C. in thirteen minutes after the start of power feed, and the average heating rate was 5.7° C. per minute. Tofu taken out of the device at this point had no uncoagulated portion and no yuba. Thus objective tofu that was homogenous and flavorful was obtained.

Example 2

In the device used in Example 1, soy milk was heated without adding nigari while setting the set temperature to 90° C. The soy milk reached 90° C. in about eight minutes after the start of power feed. After that, the temperature was kept by on/off control for five minutes, and then the housing 9 was opened to reveal that a pale yellow film of yuba was uniformly formed on the soy milk surface in the coagulation vessel 3. The yuba film was observed to become thicker as the soy milk surface cooled down from exposure. This yuba film was scooped up, and after a while, a new layer of yuba was formed. After five minutes or so, the housing 9 was closed and on/off control was conducted in order to keep the temperature of the soy milk. The process was repeated, obtaining objective yuba that tastes good.

TABLE 1

| Time past start of power feed (Minute) | Temperature (° C.) | Current value (A) |
|---|---|---|
| Immediately after starting | 5.5 | 3.5 |
| 2 | 40.5 | 7.8 |
| 3 | 57.5 | 8.5 |
| 4 | 70.2 | 9.9 |
| 5 | 80.0 | 9.3 |
| 6 | 82.5 | 9.5 |

TABLE 1-continued

| Time past start of power feed (Minute) | Temperature (° C.) | Current value (A) |
|---|---|---|
| 7 | 81.0 | 9.4 |
| 8 | 82.1 | 9.5 |

TABLE 2

| Time past start of power feed (Minute) | Temperature (° C.) | Current value (A) |
|---|---|---|
| Immediately after starting | 6.2 | 3.6 |
| 1 | 23.5 | 3.7→0 |
| 2 | 24.6 | 0→4.2 |
| 3 | 40.5 | 4.8→0 |
| 4 | 41.2 | 0→5.0 |
| 5 | 57.5 | 5.8→0 |
| 6 | 60.3 | 0→6.1 |
| 7 | 69.3 | 6.2→0 |
| 8 | 68.7 | 0→7.5 |
| 9 | 75.1 | 7.8→0 |
| 10 | 74.8 | 0→8.5 |
| 11 | 79.0 | 9.1→0 |
| 12 | 78.3 | 0→9.5 |
| 13 | 80.2 | 9.5→0 |

Example 3

A coagulating device as the one shown in FIGS. 7 to 10 was manufactured by way of trial and an experiment of making tofu was conducted. This device was structured to make tofu when a coagulation vessel 3 holding soy milk was loaded into a housing 9, a front lid 27 and a top lid 26 are closed, and a start/changeover switch 4 was turned to Tofu, and to make yuba by turning the switch 4 to Yuba at that point.

Figure 7:
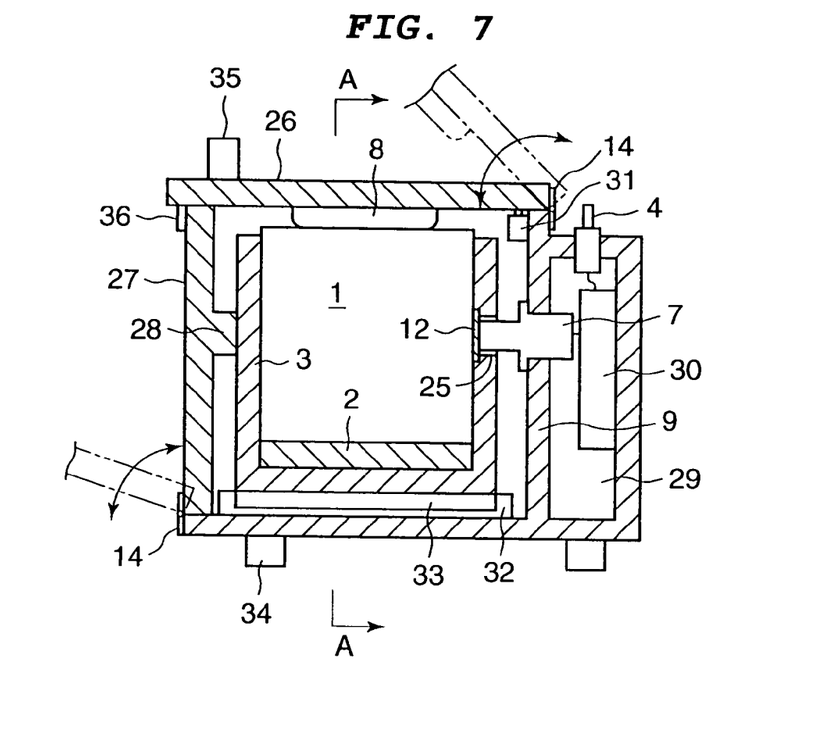
FIG. 7 is a sectional view taken along the line B—B of FIG. 8 and shows a device according to another embodiment of the present invention.

As shown in FIG. 7, the front lid 27 was attached to the front edge of the bottom of the housing 9 with a hinge 14 while the top lid 26 was attached to the top edge of the rear of the housing 9 with another hinge 14. The top lid 26 had a pair of electrode terminals 8 and 8 attached thereto. The front lid 27 had a protrusion 28. The rear portion of the housing 9 formed a control chamber 29 to house a control unit 30. The top face of the rear portion of the housing 9 had the start/changeover switch 4 and an indicator lamp 37 as the one shown in FIG. 9.

The temperature sensor 7 shown in FIG. 6 was installed in the border between the rear portion of the housing 9 and the rear portion where the control chamber 29 was located. A top lid switch 31 was attached to the top edge of a side of the housing 9.

Rails 32 and 32 were laid on the bottom of the housing 9 to be engaged with guides 33 and 33 that were provided on the underside of the coagulation vessel 3. This allowed the vessel to slide back and forward along the rails.

Figure 8:
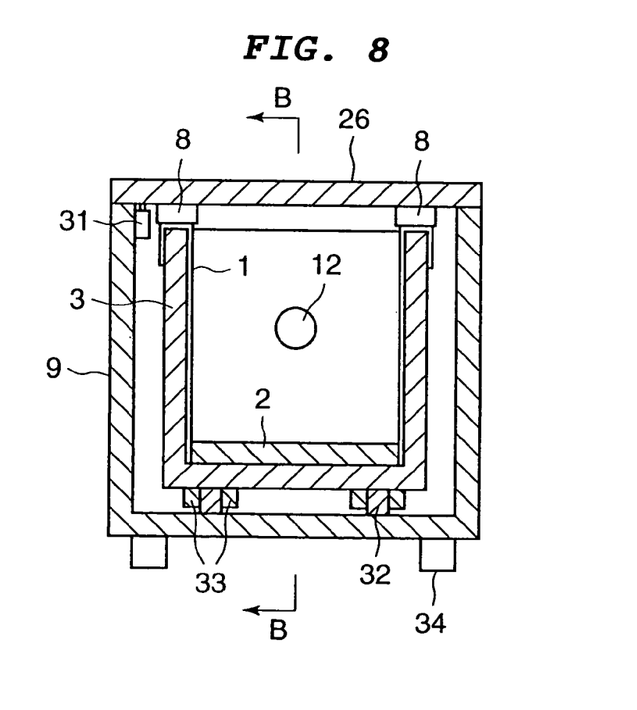
FIG. 8 is a sectional view taken along the line A—A of FIG. 7 and illustrates the device according to the embodiment of the present invention.
Figure 9:
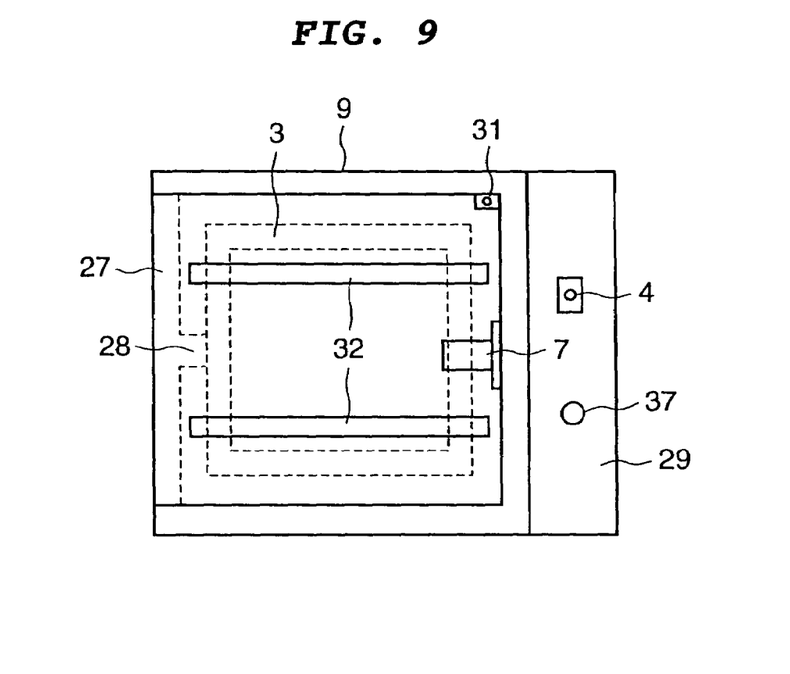
FIG. 9 is a top view showing the device according to the embodiment of the present invention.

The coagulation vessel 3 had a pair of electrode plates 1 and 1 inserted therein as shown in FIGS. 7 and 8. A small, thin piece of metal 12 was attached to one of side walls of the vessel that had no electrode plate 1. As shown in FIG. 7, the rear side of this side wall formed a concave portion 25 where the small, thin piece of metal 12 was exposed.

The coagulation vessel 3 holding soy milk was put inside the housing 9 with the guide 33 and 33 of the vessel engaged with the rails 32 and 32. As the front lid 27 was closed, the coagulation vessel 3 was pushed by the protrusion 28 to slide backward and insert the front end portion of the temperature sensor 7 in the concave portion 25. This brought the small, thin piece of metal 12 into surface-to-surface contact with the heat transfer plate 18 of the temperature sensor 7 through pressurization.

Closing the top lid 26 brought electrode terminals 8 and 8 into contact with the electrode plates 1 and 1, thus setting the device ready for electricity feed by the top lid switch 31. In this state, the start/changeover switch 4 was turned to Tofu or Yuba to control electrification of soy milk.

Figure 10:
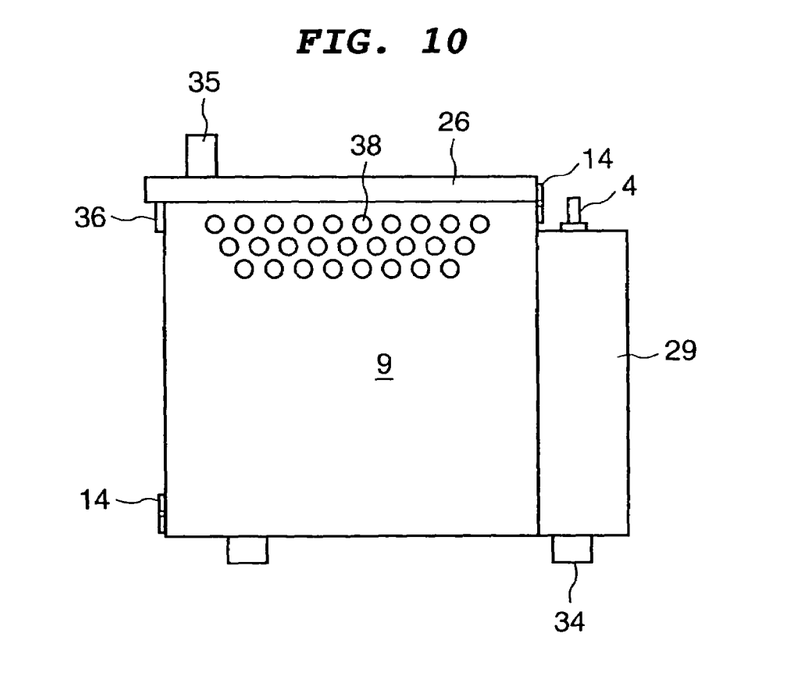
FIG. 10 is a side view showing the device according to the embodiment of the present invention.

As shown in FIG. 10, ventilation holes 38, 38, . . . were opened in the upper portions of the side walls of the housing 9. The ventilation holes were provided for better ventilation in making yuba.

The coagulation vessel 3 was made of acrylic resin. The bottom of the coagulation vessel 3 was a 110 mm×110 mm square (inner size) and the internal volume of the vessel was 1,000 cc. The electrode plates 1 and 1 were titanium plates connected to each other at the bottom by an insulating plastic plate 2. The electrode area was set to 9900 mm² while setting the distance between the electrode plates to 110 mm. An alumel-chromel thermoelectric couple serves as a thermoelectric couple 19 of the temperature sensor 7. The heat transfer plate 18 was a copper plate. The small, thin piece of metal 12 was a copper plate having a thickness of 0.3 mm and a diameter of 7 mm.

1,000 cc of commercially-available soy milk was poured into the coagulation vessel 3. 10 cc of natural nigari was added to the soy milk, and the mixture was stirred before the vessel was loaded into the housing 9 in the manner described above. The front lid 27 and the top lid 26 were closed, and the start/changeover switch 4 was turned to Tofu, thereby starting electrification of the soy-milk-mixture. Through automatic on/off control of the current, tofu was obtained in about fifteen minutes. The temperature reached was 80° C. and the average heating rate was 5° C. per minute. The maximum current value was 10.5 A, which was almost exactly as calculated.

The resultant tofu tasted round and good as in the examples (those according to the present invention, not the comparative example) in Example 1.

With a device of the present invention, anyone in common households can readily make fresh tofu and yuba that taste flavorful and round at any time in any amount needed (small or large). The device does not have safety problems, is solid, and is easy to wash after use.

What is claimed is:

1. A soy milk coagulating device comprising:
a coagulation vessel with an internal volume of 1,000 cc or less;
two electrode plates facing each other to form a pair in the vessel; and
a power feed controlling mechanism for controlling electricity fed to the electrode plates,
wherein the power feed controlling mechanism has a temperature sensor attached to a side wall or the bottom of said coagulation vessel and is composed of a tofu control system, a yuba control system and switching means, the tofu control system being provided to heat soy milk to a set temperature at an average heating rate of not faster than 8° C. per minute, the yuba control system being provided to heat soy milk to a set temperature without imposing any limitation on the heating rate, and the switching means being provided to switch between said two control systems.

2. A soy milk coagulating device according to claim 1, wherein the temperature sensor is attached to a side wall or the bottom of the coagulation vessel without being exposed on the inner surface of said coagulation vessel.

3. A soy milk coagulating device according to claim 2, wherein the temperature sensor is fastened to a small thin piece of metal attached to the inner surface of said coagulation vessel.

4. A soy milk coagulating device according to claim 2, wherein the temperature sensor is composed of a heat transfer plate, a thermocouple and a pressurizing mechanism, the heat transfer plate being disposed in face-to-face contact with a small thin piece of metal attached to the inner surface of said coagulation vessel, the thermocouple being fastened to the heat transfer plate, and the pressuring mechanism being provided to bring the heat transfer plate and the small thin piece of metal into contact with each other.

5. A soy milk coagulating device according to claim 3, wherein the surface of the small thin piece of metal is coated with a heat-conductive insulating film.

6. A soy milk coagulating device according to claim 4, wherein the surface of the small thin piece of metal is coated with a heat-conductive insulating film.

7. A soy milk coagulating device comprising:
a coagulation vessel with an internal volume of 1,000 cc or less;
two electrode plates facing each other to form a pair in the vessel; and
a power feed controlling mechanism for controlling electricity fed to the electrode plates,
wherein the power feed controlling mechanism has a temperature sensor attached to a side wall or the bottom of said coagulation vessel and is composed of a tofu control system, a yuba control system and switching means, the tofu control system being provided to heat soy milk to a set temperature at an average heating rate of faster than 8° C. per minute and not faster than 15° C. per minute and keeps the heated soy milk at the set temperature for at least 5 minutes, the yuba control system being provided to heat soy milk to a set temperature without imposing any limitation on the heating rata, and the switching means being provided to switch between said two control systems.

8. A soy milk coagulating device according to claim 7, wherein the temperature sensor is attached to a side wall or the bottom of the coagulation vessel without being exposed on the inner surface of said coagulation vessel.

9. A soy milk coagulating device according to claim 8, wherein the temperature sensor is fastened to a small thin piece of metal attached to the inner surface of said coagulation vessel.

10. A soy milk coagulating device according to claim 8, wherein the temperature sensor is composed of a heat transfer plate, a thermocouple and a pressurizing mechanism, the heat transfer plate being disposed in face-to-face contact with a small thin piece of metal attached to the inner surface of said coagulation vessel, the thermocouple being fastened to the heat transfer plate, and the pressuring mechanism being provided to bring the heat transfer plate and the small thin piece of metal into contact with each other.

11. A soy milk coagulating device according to claim 9, wherein the surface of the small thin piece of metal is coated with a heat-conductive insulating film.

12. A soy milk coagulating device according to claim 10, wherein the surface of the small thin piece of metal is coated with a heat-conductive insulating film.

13. A soy milk coagulating device comprising:
a coagulation vessel with an internal volume of 1,000 cc or less;
two electrode plates facing each other to form a pair in the vessel; and
a power feed controlling mechanism for controlling electricity fed to the electrode plates,
wherein the power feed controlling mechanism has a temperature sensor attached to a side wall or the bottom of said coagulation vessel and is composed of a tofu control system, a yuba control system and switching means, the tofu control system being provided to heat soy milk to a sat temperature at an average heating rate of not faster than 8° C. per minute, the yuba control system being provided to heat soy milk to a set temperature without imposing any limitation on the heating rate, and the switching means being provided to switch between said two control systems, and said tofu control system has a relay control function to cut off power feed to the electrode plates during temperature measurement.

14. A soy milk coagulating device comprising:
a coagulation vessel with an internal volume of 1,000 cc or less;
two electrode plates facing each other to form a pair in the vessel; and
a power feed controlling mechanism for controlling electricity fed to the electrode plates,
wherein the power feed controlling mechanism has a temperature sensor attached to a side wall or the bottom of said coagulation vessel and is composed of a tofu control system, a yuba control system and switching means, the tofu control system being provided to heat soy milk to a set temperature at an average heating rate of faster than 8° C. per minute and not faster than 15° C. per minute and keeps the heated soy milk at the set temperature for at least 5 minutes, the yuba control system being provided to heat soy milk to a set temperature without imposing any limitation on the heating rate, and the switching means being provided to switch between said two control systems, and said tofu control system has a relay control function to cut off power feed to the electrode plates during temperature measurement.

* * * * *